United States Patent Office 3,490,095
Patented Jan. 20, 1970

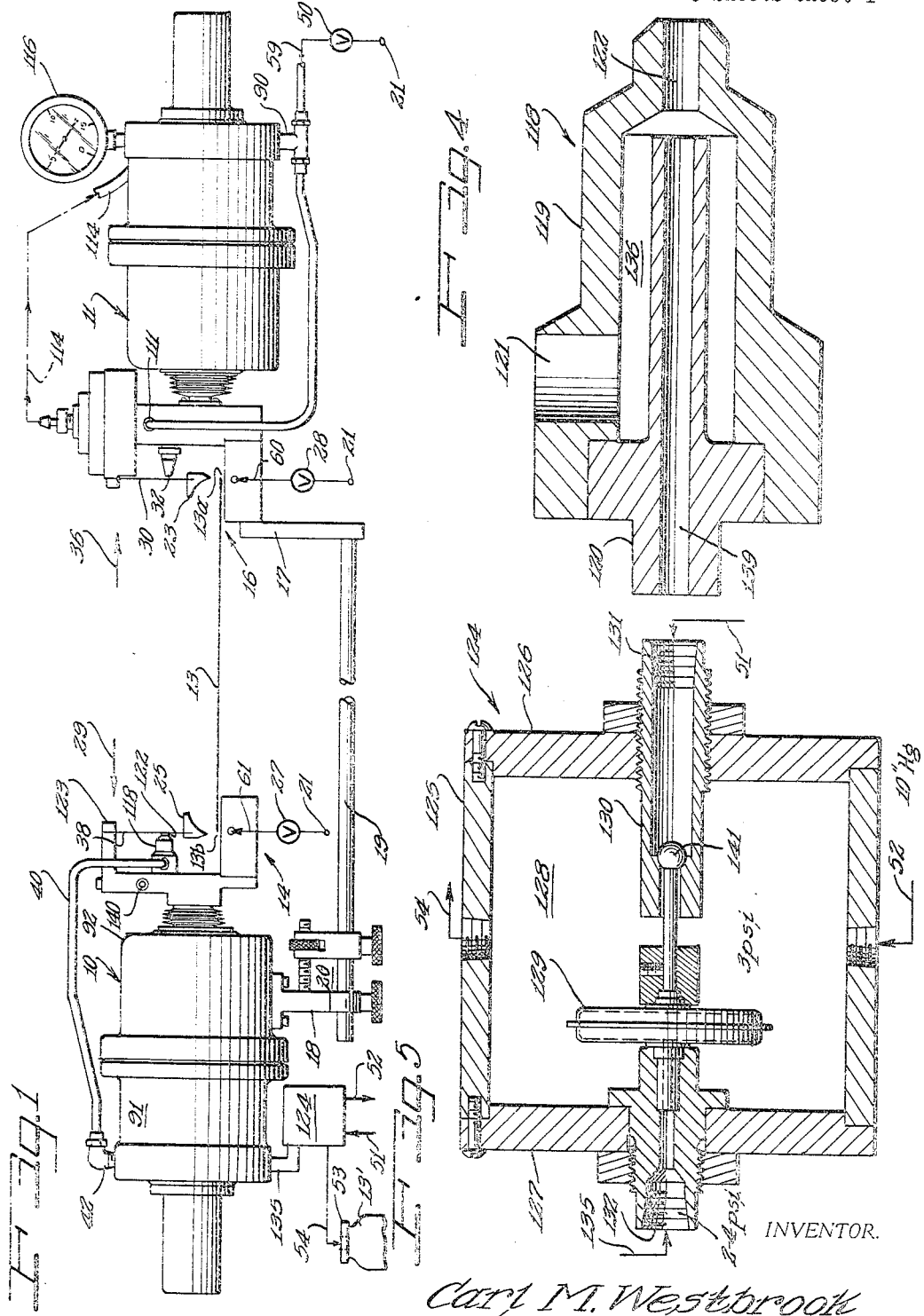

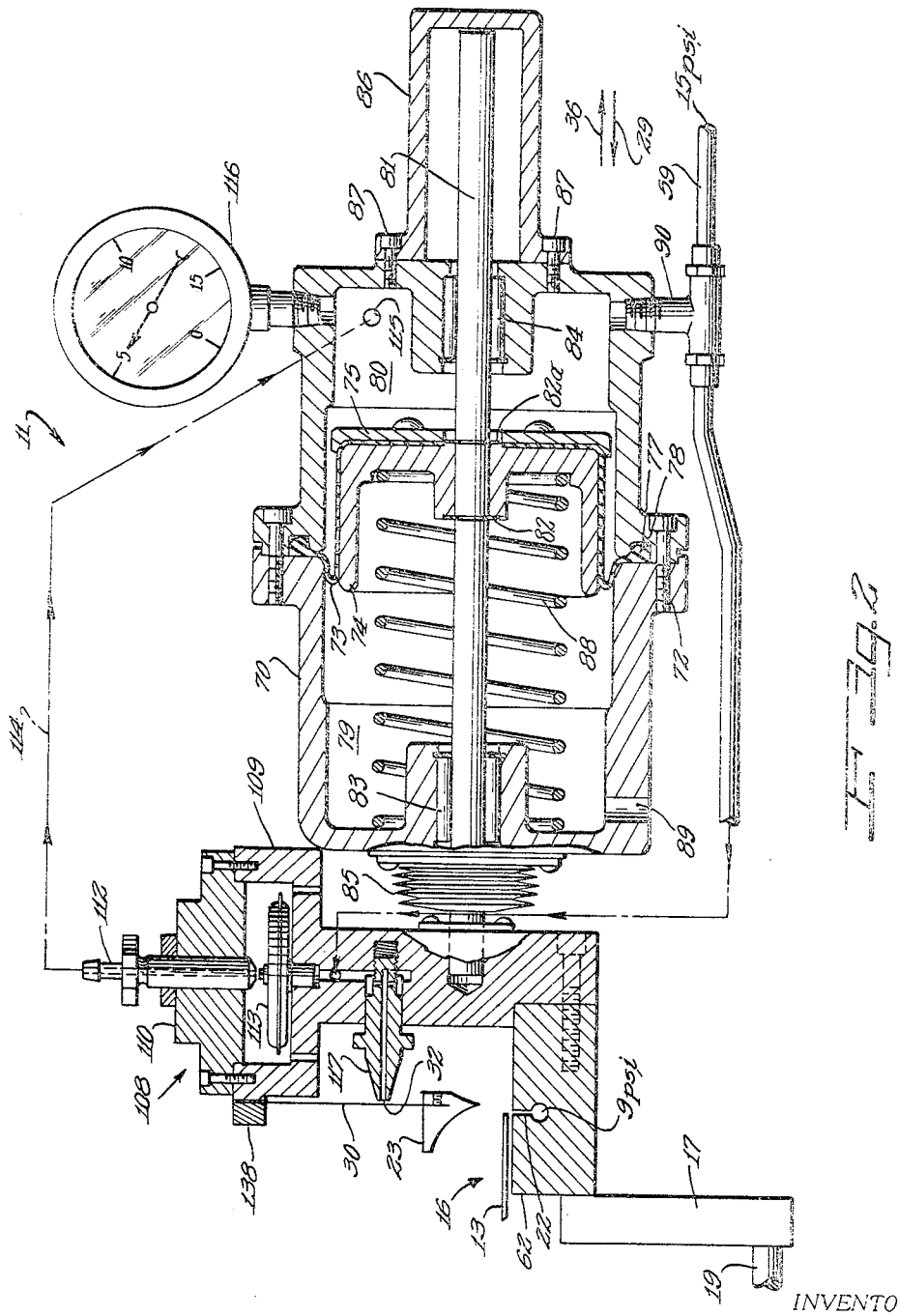

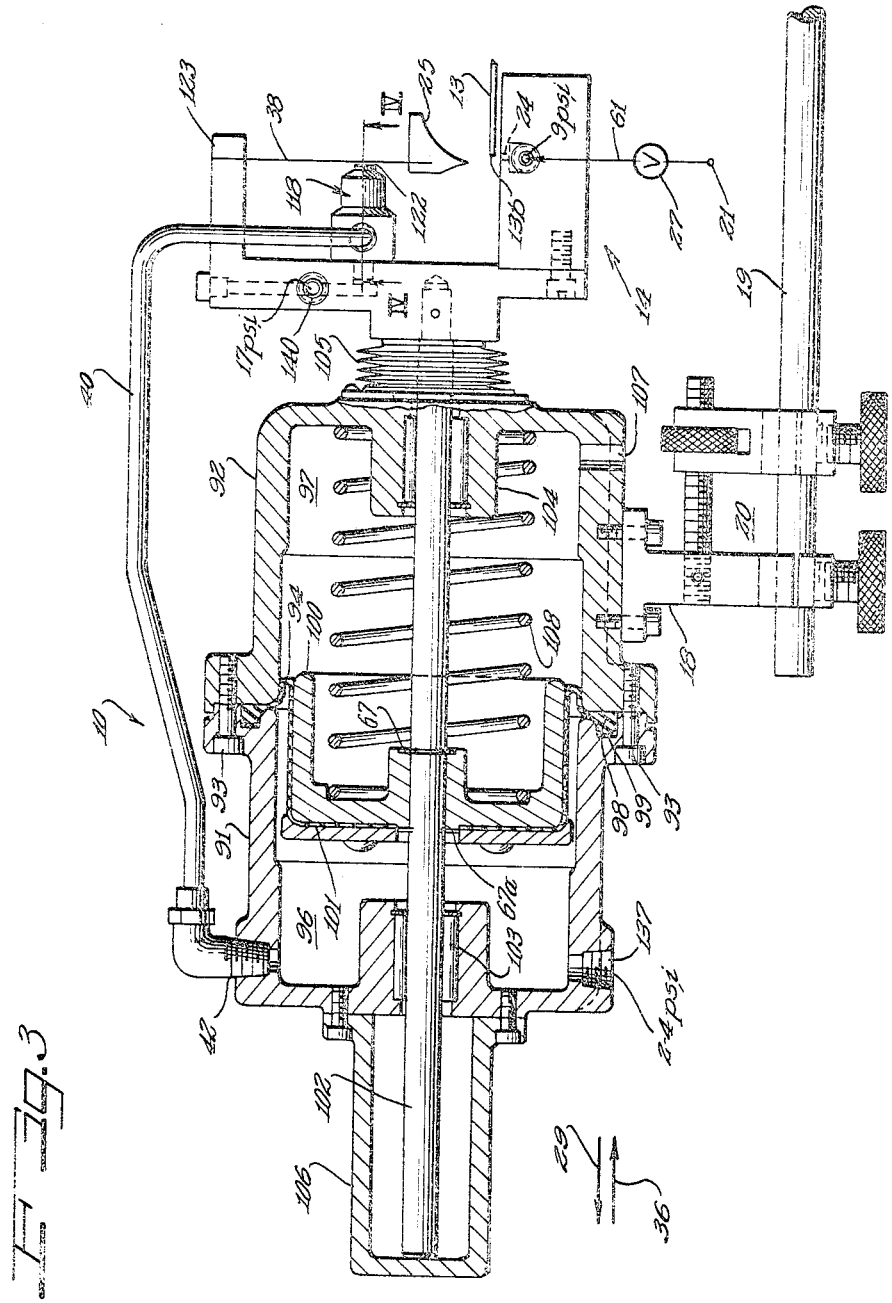

3,490,095
FILM WIDTH SENSING DEVICE
Carl M. Westbrook, Beloit, Wis., assignor to Beloit Corporation, Beloit, Wis., a corporation of Delaware
Continuation-in-part of application Ser. No. 621,560, Mar. 8, 1967. This application Oct. 3, 1968, Ser. No. 764,710
Int. Cl. B29d 7/02
U.S. Cl. 18—2
6 Claims

ABSTRACT OF THE DISCLOSURE

A film width sensing device employs a pair of pneumatically actuated sensing devices for tracking the edges of a continuously produced film and for developing a signal for a valve which controls the width of the film as it is being produced.

CROSS REFERENCE TO RELATED APPLICATIONS

This application is a continuation-in-part of my United States patent application entitled "Film Width Sensing Device," Ser. No. 621,560, filed Mar. 8, 1967, fully included herein by this reference, the reference numerals of the present application being the same as those in the parent application for similar apparatus and function.

BACKGROUND OF THE INVENTION

Field of the invention

This invention relates generally to a film width sensing and control apparatus, and particularly to an apparatus for sensing and controlling the size of an extruded tubular film which is subsequently pressed by rollers to form a web having two layers.

Description of the prior art

The manufacture of hollow plastic film is a continuous process, and for reasons of economy, the process must be one by which plastic film can be made at a relatively high speed. As described in the parent application, control devices which are used in the manufacture of plastic film to control various parameters of the finished product must be of such a nature as to respond to minute changes of the parameter being sensed. However, often the response of this sensitive controlled device is such that the correcting signal developed thereby may cause a rapid change in that portion of the process which is in control of the parameter being sensed, and this rapid change may be noticeable in the finished product. Furthermore, rapid control of a continuation process may cause hunting of the manufacturing apparatus.

Therefore, in the manufacture of flat hollow film, it is desirable that the sensing controlled apparatus be sensitive to slight variations of the parameter being sensed and yet provide gradual control of the manufacturing apparatus to restore the particular parameter being sensed to its desired condition. This will allow slight vaiations of the particular parameter being sensed to gradually return to its desired condition, thereby eliminating sudden or noticeable changes in the finished product.

The apparatus in the above application accomplishes the foregoing requirements by providing a pair of sensing devices disposed adjacent opposite edges of a moving web. As an edge of the web moves transversely to its direction of travel, the corresponding sensing head would be actuated to also move in the same direction with one of the sensing devices deriving a control signal for the manufacturing apparatus in response to differential transverse movement between the two sensing heads to gradually control the manufacturing apparatus. The apparatus of the present invention also employs this same basic sensing and control technique; however, it has been determined that the sensing devices may be operated much faster and over a wider range, while maintaining a gradually changing control over the manufacturing apparatus, by employing means for controlling the air pressure differentials in the apparatus which controls the movement of each of the sensing devices.

SUMMARY OF THE INVENTION

Briefly, the sensing and control apparatus of the present invention provides a pair of sensing heads which are positioned at opposite sides of a flattened film. Fluid jet streams are directed substantially perpendicular to the edge of the film, the fluid jet stream passing the edge of the film and impinging upon the surface of a tapered sensor. Deviations of position of the edge of the film cause variations in the quantity of the fluid jet stream which impinges upon the sensor. A fluid passage is connected to the sensing head and has an opening therein to allow fluid within the passage to escape substantially at right angles to the fluid jet stream which is derived at the sensing head. A spring depends from the sensing head and has a portion thereof in proximity to the opening of the fluid passage to obstruct fluid flow from the passage. The tapered sensor is fastened to the spring to cause the spring to be urged against the opening of the fluid passage in response to the quantity of fluid of the fluid jet stream impinging upon the tapered sensor.

The portion of the spring which is abutted against the opening of a fluid passage obstructs the fluid flow therefrom, thereby varying the static air pressure within the passage and tends to move the spring away from the opening, while the jet stream impinging upon the tapered sensor tends to move the spring toward or away from the opening, depending upon the quantity and direction of the jet stream. The static pressure within the air passage is connected to a pneumatic control valve which, in turn, controls the position of the sensor relative to the edge of the film within the predetermined limits. For example, should the edge of the web tend to move away from the jet stream, the sensor and the springs are urged firmly against the opening of the air passage to cause an increase in the static pressure within the air passage. The increased static pressure within the air passage is sensed by the control valve which, in turn, moves the sensing head in the direction of deviation of the edge of the film. However, should the edge of the web tend to move toward the jet stream, thereby obstructing the flow of the jet stream toward the sensor, the sensor and spring are urged away from the opening of the air passage by the action of the static pressure therein. This allows fluid to escape from the fluid passage thereby decreasing the static pressure within the fluid passage. The control valve will then move the sensing head in the direction of deviation to place the edge of the film at the desired position relative to the fluid jet stream. Means are provided for amplifying the changes in static pressure so that the sensing head may be actuated more quickly and over an extended range of travel.

The sensing head which is positioned at the opposite edge of the film functions in substantially the same manner. However, the body of the control valve associated with the second sensing head is rigidly connected to the first-mentioned sensing head. Therefore, as the first-mentioned sensing head moves toward or away from the film, the control valve and sensing head positioned opposite thereto will move in the same direction. Therefore, the two sensing heads on opposite sides of the moving film tend to follow lateral movement of the film as the film passes between the sensors. However, should the overall width of the film vary, the second-mentioned sensor will develop a control signal indicative of the film width to provide a corresponding change in manufacturing process to correct the film width.

The second-mentioned sensing head develops a signal in response to variations of film width for a control valve which controls the operation of the extruding apparatus. The control valve is provided with means forming and providing a film width variation signal to the extruding apparatus while maintaining an internal predetermined pressure which dampens sudden changes in film width.

BRIEF DESCRIPTION OF THE DRAWINGS

The invention, its construction and operation, will be more fully realized and understood from the following detailed description taken in conjunction with the accompanying drawings in which like reference numerals throughout the various views of the drawings are intended to designate similar elements or components, and wherein:

FIG. 1 is an elevational view of the film width sensing and control apparatus constructed in accordance with the principles of the present invention and wherein the air connections are illustrated schematically;

FIG. 2 is an elevational view, partially in cross section, showing the details of one of the sensing devices;

FIG. 3 is an elevational view, partially in cross section showing the other sensing device in detail;

FIG. 4 is a sectional view of an orifice of the apparatus shown in FIG. 3 taken along the line IV—IV; and FIG. 5 is an elevational sectional view of the control valve which controls the extruding apparatus.

DESCRIPTION OF THE PREFERRED EMBODIMENT

FIGS. 1 to 5 show a film width sensing apparatus as comprising a pair of pneumatic actuators 10 and 11 which are positioned on opposite sides of a continuously moving web 13. A sensing head 14 is connected to the actuator 10 for movement relative thereto. Similarly, a sensing head 16 is connected to the actuator 11 for movement relative thereto. A bracket 17 is secured to the sensing head 16, and a bracket 18 is secured to the actuator 10. Connected between the brackets 17 and 18 is a rod 19 which serves to maintain the actuator 10 and the sensing head 16 separated by a predetermined dimension. One end of the rod 19 is fixedly secured to the bracket 17, while the other end of the rod 19 is slidably connected to the bracket 18 via the adjusting assembly 20. Therefore, the actuator 10 and the sensing head 14 can be moved manually toward or away from the sensing head 16 and locked into position by the adjusting assembly 20.

An air supply 21 is in fluid communication with an orifice 22 of the sensing head 16. A tapered air flow sensor 23 is positioned directly opposite the orifice 22. The fluid jet stream from the orifice 22 is directed toward the sensor 23 and impinges upon the tapered surface thereof tending to move the sensor 23 in a lateral direction. Similarly, the air supply 21 is in fluid communication with an orifice 24 which is positioned on the sensing head 14 directly opposite a sensor 25. A portion of the jet stream from the orifice 22 is interrupted by the edge 13a of the web 13, and a portion of the jet stream from the orifice 24 is interrupted by the edge 13b of the web 13. As the edges of the web 13 tend to move laterally the quantity of air which impinges upon the sensors 23 and 25 respectively will vary.

The pair of pressure reducing valves 27 and 28 are connected between the air supply 21 and the orifices 24 and 22 respectively to maintain the jet streams from the orifices at a predetermined value. Should the web 13 move in the direction indicated by the arrow 29, more of the jet stream from orifice 22 will impinge upon the sensor 23 to urge the spring 30 against an orifice 32 of an orifice assembly 117. However, the pressure in the passage 33 tends to urge the spring 30 away from the orifice 32. The cooperating action between the jet stream from orifice 22 and the pressure in the orifice assembly 117 cause the spring 30 to be urged against the orifice 32 to a greater or lesser degree depending upon the jet stream from the orifice 22.

The orifice assembly 117 is in fluid communication with valve 50 which, in turn, is connected to air supply 21. As the static air pressure within orifice assembly 117 increases, due to the restriction afforded by the spring 30 which is over the orifice 32, the increased pressure is sensed within a chamber of the actuator 11. This causes the sensing head 16 to be moved in the direction of the arrow 29. The sensing head 16 continues to move toward the edge 13a of the film 13 until the jet stream is again impeded by the edge 13a.

It will be noted that as the sensing head 16 is moved in the direction indicated by the arrow 29, so also is the actuator 10. Therefore, if the film 13 did not decrease in width, but merely moved laterally, the entire width sensing apparatus would move laterally to maintain the edges 13a and 13b in the proper sensing relation to the sensing heads 16 and 14, respectively. However, should the edge 13a move in the direction indicated by arrow 36, the jet stream from orifice 32 is obstructed thereby allowing the sensor 23 and the spring 30 to be moved further away from the orifice 32 of the air passage 117. This action will cause the static air pressure within the air passage 117 to decrease, thereby decreasing the static pressure within the chamber of the actuator 11. Therefore, the sensing head 16 will move in the direction indicated by the arrow 36 until the edge 13a is once again in the proper sensing relation within the sensing head 16.

The sensor 25 is connected to a spring 30 which, in turn, is suspended from element 123 of sensing device 14 to be in proximity to an orifice 122 of an orifice assembly 118. Should the edge 13b of the web 13 tend to move in the direction indicated by the arrow 36, more of the jet stream from the orifice 24 will impinge upon the sensor 25 thereby causing the sensor 25 to urge the spring 38 more firmly against the orifice 122 of the orifice assembly 118. This action will cause the static air pressure within the air passage 40 to increase. However, should the edge 13 tend to move in the direction indicated by the arrow 29, less of the jet stream from the orifice 24 will impinge upon the sensor 25, thereby allowing the static pressure within the air passage 40 to move the sensor 25 and the spring 38 away from the orifice 122. This action will cause the static pressure within the air passage 40 and assembly 118 to bleed through the orifice 122, thereby decreasing the pressure within the passage 40 and assembly 118.

The orifice assembly 118 has an air inlet 139 which is in fluid communication with a valve (not shown) and air supply 21. Also, the orifice assembly 118 is connected to a chamber within the actuator 10 via an air line 40 and an input 42. Therefore, variations in the position of the edge 13b are sensed by the sensor 25 to cause corresponding variations in the static pressure within the orifice assembly 118. An increase in static pressure within the orifice assembly 118 will cause the actuator 10 to move the sensing head 14 in the direction indicated by arrow 36. On the other hand, a decrease in static pressure within the orifice assembly 118 will move the sensing head 14 in the direction indicated by arrow 29.

The aforementioned chamber of actuator 10 is in fluid communication with chamber 128 of control valve 124 by way of connection 135 to the inlet 132 of the control valve. Chamber 128 is maintained at a relatively low pressure and is in fluid communication with a source of air supply over conduit 51 through inlet 131 and a vacuum supply, say 10 inches of mercury, via conduit 52 and inlet 133. Conduit 54 from outlet 134 is connected to control the extrusion head 53 which, in turn, controls the width of the plastic web 13'. Mounted in the control valve is diaphragm 129 which is connected in fluid communication with inlet 132 and inlet 131. Pressure changes at inlet 132 cause an inflation or deflation of diaphragm 129 and corresponding variations of opening of the valve formed by seat 130 and ball 141.

For a better understanding of the detailed construction and operation of the actuator 11, reference is made to FIG. 2. The actuator 11 comprises a pair of housings 70 and 71 which are connected together by a plurality of bolts 72. An elastic diaphragm 73 is held between a diaphragm holder 74 and a diaphragm plate 75. The periphery of the diaphragm 73 has a rim 77 which fits into a notch 78 between the housings 70 and 71. The rim 77 of the diaphragm 73 is held in place by the housings 70 and 71 to provide a pair of chambers 79 and 80 which are separated by the diaphragm 73.

The diaphragm holder 74 is connected to a shaft 81 by elements 82 and 82a which may be pins or retaining rings. The shaft 81 passes through a pair of bushings 83 and 84 which are carried by the end walls of the housings 70 and 71, respectively. One end of the shaft 81 extends through the housing 70 and is connected to the sensing head 16 for movement therewith.

A dust cover 85 is positioned about the end of the shaft 81 between the sensing head 16 and the outer surface of the end wall of the housing 70 to prevent foreign material being collected on the shaft 81. The other end of the shaft 81, which extends through the end wall of the housing 71 is protected by an end cover 86 which is secured to the housing 71 by a plurality of screws 87. Positioned between the interior end low of the housing 70 and the diaphragm holder 74 is a coil spring 88 which serves to bias the diaphragm 73 and the shaft 81 in the direction indicated by the arrow 36.

The chamber 79 is preferably maintained at atmospheric pressure; however, the chamber 79 may receive a reference pressure through inlet 89. The static pressure within the fluid passage 117 is sensed by the chamber 80 via the line 114. As mentioned hereinabove, an increase in static pressure within the chamber 80 tends to move the sensing head 16 in the direction of the arrow 29. On the other hand, a decrease in static pressure within the chamber 10 is to move the sensing head 16 in a direction indicated by the arrow 36 by the action of the coil spring 88.

Interposed between the pressure passage 117 and the chamber 80 is a valve assembly 108 which serves to amplify the changes in static pressure which occur in passage 117. The valve includes a housing 109 and a cover 110 which form a chamber carrying a diaphragm 113. The diaphragm 113 is connected in fluid communication with the input 111 and the orifice assembly 117 and operates to throttle the air in the upper air entrance 112 which is in fluid communication with chamber 80 via line 114 and opening 115. The air from the input 111, in addition to regulating the height of the throttle diaphragm 113, also bleeds through the orifice 32 against the leaf spring 30. When the leaf spring moves away from the orifice 32, the diaphragm 113 deflates and more air is allowed to bleed through the upper air entrance which decreases pressure in chamber 80 to allow the spring 88 to urge the sensing device 16 in the direction of arrow 36. The drop in air pressure with this double bleeding arrangement is more pronounced than that of the single bleeding arrangement of the parent application, say in the order of from 9 to 2 p.s.i.

When the spring 30 restricts the orifice 32, diaphragm 113 restricts the upper air entrance 112 and pressure increases rapidly in chamber 80 to move the sensing device 16 against the spring 88. The pressure increase in the instant case is both more rapid and of greater magnitude than that disclosed in the parent application.

Reference is made now to FIG. 3 for a more detailed discussion of the apparatus for sensing the opposite edge of the moving web. The actuator 10 comprises a pair of housings 91 and 92 which are connected together by a plurality of bolts 93. A diaphragm 94 is positioned between the housings 91 and 92 to provide a pair of chambers 96 and 97 on opposite sides of the diaphragm 94. The periphery of the diaphragm 94 has a rim 98 which fits into a groove 99 between the housings 91 and 92. The diaphragm 94 is formed about a diaphragm holder 100 and is secured thereto by a diaphragm end plate 101.

A shaft 102 passes through the opposing end walls of the housings 91 and 92 and has one end thereof secured to the sensing head 14. A pair of bushings 103 and 104 are carried by the end walls of the housings 91 and 92 respectively. A dust cover 105 is positioned about the shaft 102 between the exterior of the end wall of the housing 92 and the sensing head 114, while an end cover 106 is secured to the exterior of the end wall of the housing 91 and over the extended end portion of the shaft 102.

The chamber 97 is preferably maintained at atmospheric pressure. However, the chamber 97 may be connected to a reference supply of air through inlet 107. The chamber 96 is in fluid communication with the orifice assembly 118 via the line 40 and inlet 42. Therefore, an increase in static pressure within the assembly 118 will cause the sensing head 14 to move in the direction of the arrow 36. On the other hand, a decrease in static pressure within the chamber 96 will cause the sensing head 14 to move in the direction of the arrow 29.

The orifice assembly 118 is shown in greater detail in FIG. 4 as comprising an inlet 120 having a bore 139 extending therethrough which is in fluid communication with orifice 122, chamber 136 and outlet 121. The assembly 118 is constructed such that the pressure differential through outlet 121 is not greater between extremes whether the orifice 122 is open or completely blocked by spring 38; the lateral movement of the sensing device 14 against spring 108 accordingly being neither very far nor very rapid so that sudden changes in the film width are avoided.

The control valve 124 is shown in greater detail in FIG. 5 as comprising a cylindrical housing 125 and end covers 126 and 127 which form a chamber 128. An inlet 131, which is connected to an air supply via conduit 51, is in adjustable fluid communication with chamber 128. A diaphragm 129 is connected in fluid communication with inlet 132 and is inflated and deflated by the pressure at inlet 132. A check coupling 142 secures control check 141 to diaphragm 129 in cooperable relationship to control the air at 130 through inlet 131.

Chamber 96 is connected in fluid communication with chamber 128 of control valve 124 by way of fluid conduit 135, inlet 132 and diaphragm 129. The air pressure within this passageway controls the inflation of diaphragm 129 which operates to throttle the supply of air to chamber 128 from conduit 51 and inlet 131 at the valve formed by elements 130 and 141. The pressure within chamber 128 is maintained at about 3 p.s.i. by the throttling action of the diaphragm in cooperation with a 10″ Hg vacuum supplied through inlet 133 by way of conduit 52. When the pressure in chamber 136 varies in response to the lateral movement of web edge 13b and the corresponding lateral movement of spring 38, diaphragm 129 experiences a lower pressure from inlet 132 and deflates to throttle the air through inlet 131 at elements 130 and 141. The air pressure transmitted to the extruding head 53 through outlet 134 and conduit 54 is accordingly decreased. Conversely, an increase in air pressure at chamber 136 operates to allow more air to enter chamber 128 through inlet 131 to increase the air pressure to the extruder 53. In either of the above cases, the 10″ Hg vacuum tends to smooth out the changes and provide a more linear response for the extruder 53.

The present invention has been described and illustrated by reference to specific apparatus for manufacturing plastic film; however, it will be understood that many of the concepts of the present invention may be used for sensing and controlling the width of other types of continuously moving webs. Also, many changes and modifications of the invention will become apparent to those skilled in the art

I claim as my invention:

1. An apparatus for sensing and controlling the width of a continuously moving web including:
   first and second pressure fluid supplies;
   first and second fluid operated actuators connected to said first supply;
   first and second web edge sensing devices movably connected to said first and second actuators respectively, said sensing devices positioned on opposite sides of said web;
   connecting means for connecting said first actuator to said second sensing device to cause said first actuator to move in response to movement of said second sensing device;
   first and second fluid control means connected between said sensing devices and said actuators respectively, each for controlling its respective actuator in response to deviations of positions of the moving web edge which is in proximity thereto to move its sensing device in the direction of deviation of the edge of the web;
   means for changing the width of the web prior to passing between said first and second sensing devices; and
   third fluid control means for controlling said width changing means connected between said width changing means and one of said actuators, said third controlling means including a housing defining a chamber, a first passageway in said housing connecting said width changing means in fluid communication with said chamber, a second passageway in said housing connecting said second fluid supply in fluid communication with said chamber, a third passageway in said housing connecting said first fluid supply in fluid communication with said chamber, a fourth passageway in said housing connecting said one actuator in fluid communication with said chamber, and valve means disposed in said chamber between said fourth passageway and said third passageway to dampen pressure variations in said chamber and thereby prevent rapid changes in film width.

2. The apparatus according to claim 1 wherein said first actuator includes a housing and piston means within said housing defining a control chamber and a bias chamber, said piston means connected to said first sensing device, biasing means disposed in said biasing chamber to urge said piston means toward said control chamber, and said first sensing device includes an orifice assembly having an orifice connected in fluid communication with said first fluid supply, sensing means for varying fluid flow through said orifice in response to variations of the position of the associated web edge, said orifice connected in fluid communication with said control chamber for movement of said piston means to position said first sensing means, and a fluid connection between said control chamber and said fourth passageway of said third controlling means thereby providing film width control as a function of fluid flow through said orifice.

3. The apparatus according to claim 1, wherein said second actuator includes a housing and piston means within said housing defining a control chamber and a bias chamber, said piston means connected to said second sensing device and by way of said connecting means to said first actuator, biasing means disposed in said biasing chamber to urge said piston means toward said control chamber, and said second sensing device includes an orifice assembly having an orifice connected in fluid communication with said first fluid supply, sensing means for varying fluid flow through said orifice in response to variations of the position of the associated web edge, and a series fluid circuit extending between said first supply and said orifice including pressure amplifier means connected in fluid communication with said orifice and with said control chamber of said second actuator to amplify the static pressure changes within said orifice assembly and thereby provide film tracking by said first and second actuators and said first and second sensing devices as a function of fluid flow through said orifice.

4. The apparatus according to claim 1, wherein said valve means comprises diaphragm means connected in fluid communication with said fourth passageway and including a valve disposed between said chamber and said third passageway for varying the amount of fluid flow therebetween.

5. The apparatus according to claim 1 wherein said second actuator includes a housing and piston means within said housing defining a bias chamber and a control chamber, said piston extending through said housing and connected to said second sensing device, biasing means disposed in said biasing chamber to urge said piston means toward said control chamber, said control chamber connected in fluid communication with said first fluid supply, and said second sensing device includes an orifice assembly having an orifice connected in fluid communication with said first fluid supply, sensing means for varying the fluid flow through said orifice in response to variations of the position of the associated web edge, and means interposed in fluid communication between said orifice and said control chamber of said second actuator to amplify the static pressure changes within said orifice assembly in response to variations of fluid flow through said orifice thereby to operate said piston to move said second sensing device.

6. The apparatus according to claim 5 wherein said amplifying means comprises a housing defining a chamber connected in fluid communciation with said control chamber of said second actuator and with said first fluid supply, and a diaphragm disposed in said chamber to vary the fluid pressure in said amplifier chamber in response to fluid variations through said orifice.

References Cited

UNITED STATES PATENTS

| 2,612,566 | 9/1952 | Anderson. | |
| 2,762,077 | 9/1956 | Markowitz. | |
| 2,886,651 | 5/1959 | Vogel. | |
| 3,341,888 | 9/1967 | Bridge et al. | 18—2 |

WILLIAM J. STEPHENSON, Primary Examiner

UNITED STATES PATENT OFFICE
CERTIFICATE OF CORRECTION

Patent No. 3,490,095          Dated January 20, 1970

Inventor(s) Carl M. Westbrook

It is certified that error appears in the above-identified patent and that said Letters Patent are hereby corrected as shown below:

Column 1, line 58, "vaiations" should read --variations-- line 65, "moves" should read --moved--;

Column 2, line 44, "passage, The" should read --passage. The--;

Column 4, line 64, "inlet" should read --input--; and

Column 8, line 11, "first supply" should read --first fluid supply--.

SIGNED AND SEALED

AUG 18 1970

(SEAL)
Attest:

Edward M. Fletcher, Jr.
Attesting Officer

WILLIAM E. SCHUYLER, JR.
Commissioner of Patents